United States Patent
Bae et al.

(10) Patent No.: US 7,644,513 B2
(45) Date of Patent: Jan. 12, 2010

(54) LAUNDRY DRYER AND METHOD FOR CONTROLLING DRYING COURSE OF THE SAME

(75) Inventors: Sun Cheol Bae, Gyeongsangnam-do (KR); Ja In Koo, Gyeongsangnam-do (KR); Jin Seok Hu, Gyeongsangnam-do (KR); Yang Hwan Kim, Busan (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 11/598,205

(22) Filed: Nov. 13, 2006

(65) Prior Publication Data

US 2007/0256321 A1    Nov. 8, 2007

(30) Foreign Application Priority Data

Nov. 14, 2005    (KR) .................... 10-2005-0108712

(51) Int. Cl.
F26B 3/04    (2006.01)
(52) U.S. Cl. .............................. 34/445; 34/447; 34/482; 34/483; 34/499
(58) Field of Classification Search .................. 34/446, 34/482, 483, 486, 487, 488, 491, 499, 445, 34/447; 700/299, 300, 306
See application file for complete search history.

(56) References Cited

U.S. PATENT DOCUMENTS

| | | | | | |
|---|---|---|---|---|---|
| 4,555,019 | A | * | 11/1985 | Spendel | 206/223 |
| 4,733,479 | A | * | 3/1988 | Kaji et al. | 34/446 |
| 6,305,187 | B1 | * | 10/2001 | Tsuboe et al. | 62/505 |

* cited by examiner

*Primary Examiner*—Jiping Lu
(74) *Attorney, Agent, or Firm*—KED & Associates, LLP (57) ABSTRACT

Method for controlling a drying course of a laundry dryer including the steps of (a) starting a drying course by using high temperature drying air, and sensing dryness of a drying object periodically, (b) determining a dryness saturation time point at which the dryness sensed thus exceeds a preset reference value Q, (c) determining a load of the drying object according to the drying saturation time point T_sat, and (d) varying a drying algorithm depending on the load of the drying object determined thus, whereby preventing a small amount of laundry from sticking to a drum in a drying course by varying a control algorithm of the drying motor in a case an amount of the drying object is determined to be small accurately with reference to a saturation time point of an electrode sensor.

17 Claims, 7 Drawing Sheets

LAUNDRY DRYER AND METHOD FOR CONTROLLING DRYING COURSE OF THE SAME

This application claims the benefit of Korean Application No. 10-2005-0108712, filed on Nov. 14, 2005, which is hereby incorporated by reference as if fully set forth herein.

BACKGROUND OF THE INVENTION

1. Field of the Invention

The present invention relates to a laundry dryer, and more particularly, to a laundry dryer which can improve a capability for drying laundry according to a drying load, and a method for controlling a drying course of the laundry dryer.

2. Discussion of the Related Art

In general, the laundry dryer dries laundry by supplying hot air to a drum. There are an exhaust type laundry dryer, and a condensing laundry type dryer depending on a method for processing wet air formed in a drying course.

The exhaust type laundry dryer discharges the wet air from the drum to an outside of the laundry dryer, and the condensing type laundry dryer condenses moisture in the wet air from the drum to remove the moisture from the wet air, and forwards dry air having the moisture removed therefrom to the drum again for circulation.

The laundry dryer controls an entire drying course according to a dryness of the drying object. In general, as means for sensing the dryness of the drying object, a electrode sensor is mounted on a lower side of a front of the drum.

In general, the electrode sensor has two metal plates arranged in parallel, for sensing the dryness of laundry from a difference of impedances between opposite metal plates generated according to moisture content of the drying object when the drying object is brought into contact with the opposite metal plates at the same time, and forwards the dryness in a voltage signal.

That is, a microprocessor which controls a general dryer system receives the voltage signal from the electrode sensor, determines the dryness of the drying object, and controls operation of the dryer according to this.

However, the related art laundry dryer has a problem in that a laundry sticking phenomenon takes place, i.e., a phenomenon in which the drying object is restricted at a rear of the drum or sticks to a surface of the drum in a case an amount of the laundry is small, resulting in failure of uniform drying, to fail regular drying.

The related art dryer is failed to provide means for determining the laundry amount, permitting the related art dryer to control the drying course with reference to the dryness of the drying object merely, but not with reference to a load.

SUMMARY OF THE INVENTION

Accordingly, the present invention is directed to a laundry dryer, and a method for controlling a drying course of the laundry dryer that substantially obviates one or more problems due to limitations and disadvantages of the related art.

An object of the present invention is to provide a laundry dryer, and a method for controlling a drying course of the laundry dryer, which can provide an algorithm for determining a load of the drying object.

Another object of the present invention is to provide a laundry dryer, and a method for controlling a drying course of the laundry dryer which can improve a capability for drying the drying object by applying a drying algorithm of a load thereto.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laundry dryer includes a drum rotatably mounted in a body, a drying motor for supplying rotation power to the drum, a heater for heating air being introduced to the drum to a high temperature, an electrode sensor for sensing dryness of a drying object, and a microcomputer for determining a load of the drying object according to a drying saturation time point $T\_sat$ at which the dryness sensed at the electrode sensor exceeds a preset reference value Q, and varying a drying algorithm according to the load determined thus.

Preferably, the electrode sensor is a contact type electrode sensor positioned on a front side of an inside of the drum.

The microcomputer defines a time point as a saturation time point $T\_sat$, at which the dryness sensed at the electrode sensor exceeds a preset reference value Q at first after the drying course is started, and determines an amount of the drying object depending on whether the drying saturation time point $T\_sat$ is reached within a preset time period $T\_ref$ or not.

Preferably, the microcomputer determines that the load of the drying object is small if the drying saturation time point $T\_sat$ is sensed within the preset time period $T\_ref$, and performs the drying course in a variable mode in which a rotation speed or a rotation direction of the drying motor is varied.

Preferably, the microcomputer determines that the load of the drying object is large if the drying saturation time point $T\_sat$ is sensed on an outside of the preset time period $T\_ref$, and performs the drying course in a general mode in which the drying motor is rotated at a constant speed or in one direction.

In another aspect of the present invention, a method for controlling a drying course of a laundry dryer includes the steps of (a) starting a drying course by using high temperature drying air, and sensing dryness of a drying object periodically, (b) determining a dryness saturation time point at which the dryness sensed thus exceeds a preset reference value Q, (c) determining a load of the drying object according to the drying saturation time point $T\_sat$, and (d) varying a drying algorithm depending on the load of the drying object determined thus.

The step (b) includes the steps of determining whether the dryness of the drying object exceeds the reference value Q after starting of the drying course or not, determining whether the dryness higher than the reference value Q is maintained for a time period T0 or not if the dryness of the drying object exceeds the reference value Q for the first time, and recognizing a time point as the drying saturation time point $T\_sat$, when the reference value Q is exceeded for the first time if the dryness higher than the reference value Q is maintained for a time period T0.

The step (c) includes the steps of recognizing the load is small if the drying saturation time point $T\_sat$ is sensed within a preset time period $T\_ref$, and recognizing the load is large if the drying saturation time point $T\_sat$ is sensed on an outside of the preset time period $T\_ref$.

The step (d) includes the steps of performing the drying course according to a general mode drying algorithm in a case the load of the drying object is large, and performing the drying course according to a variable mode drying algorithm in which the general mode is varied in a case the load of the drying object is small.

Preferably, in the general mode, a drying motor is rotated at a constant speed or in one direction.

Preferably, in the variable mode, the drying motor is rotated at a variable speed or in a variable direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
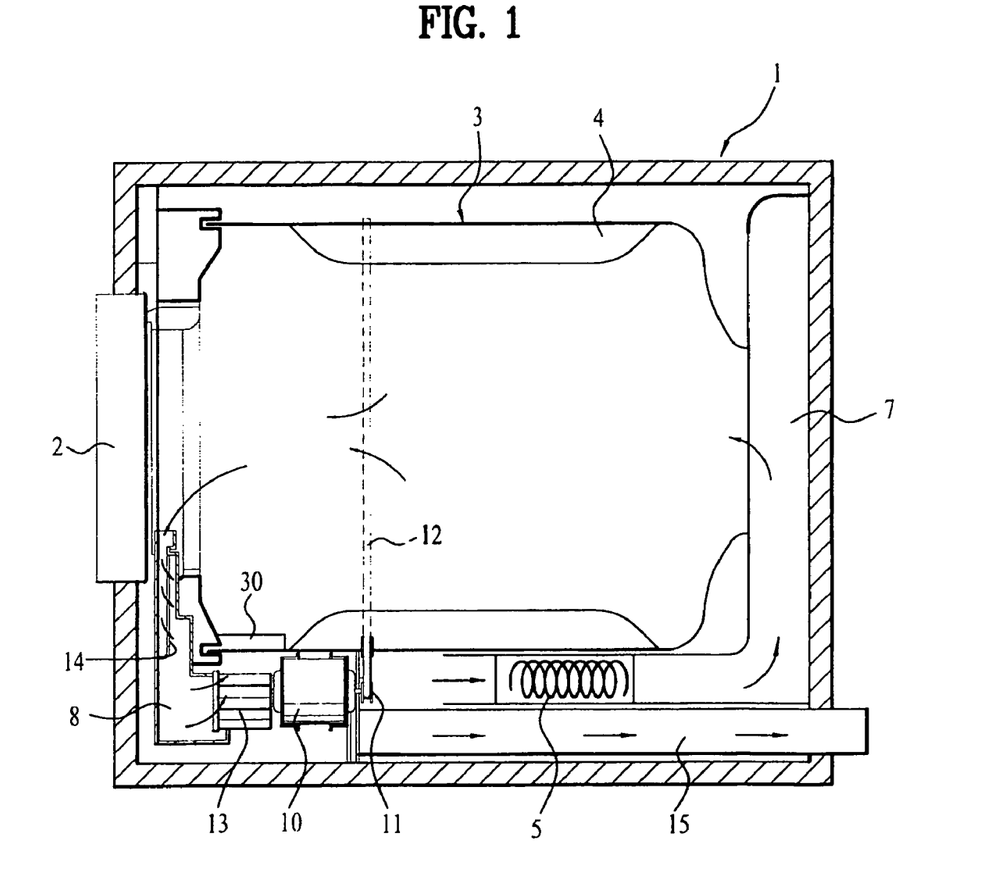
FIG. 1 illustrates a longitudinal section of a related art exhaust type laundry dryer.
Figure 2:
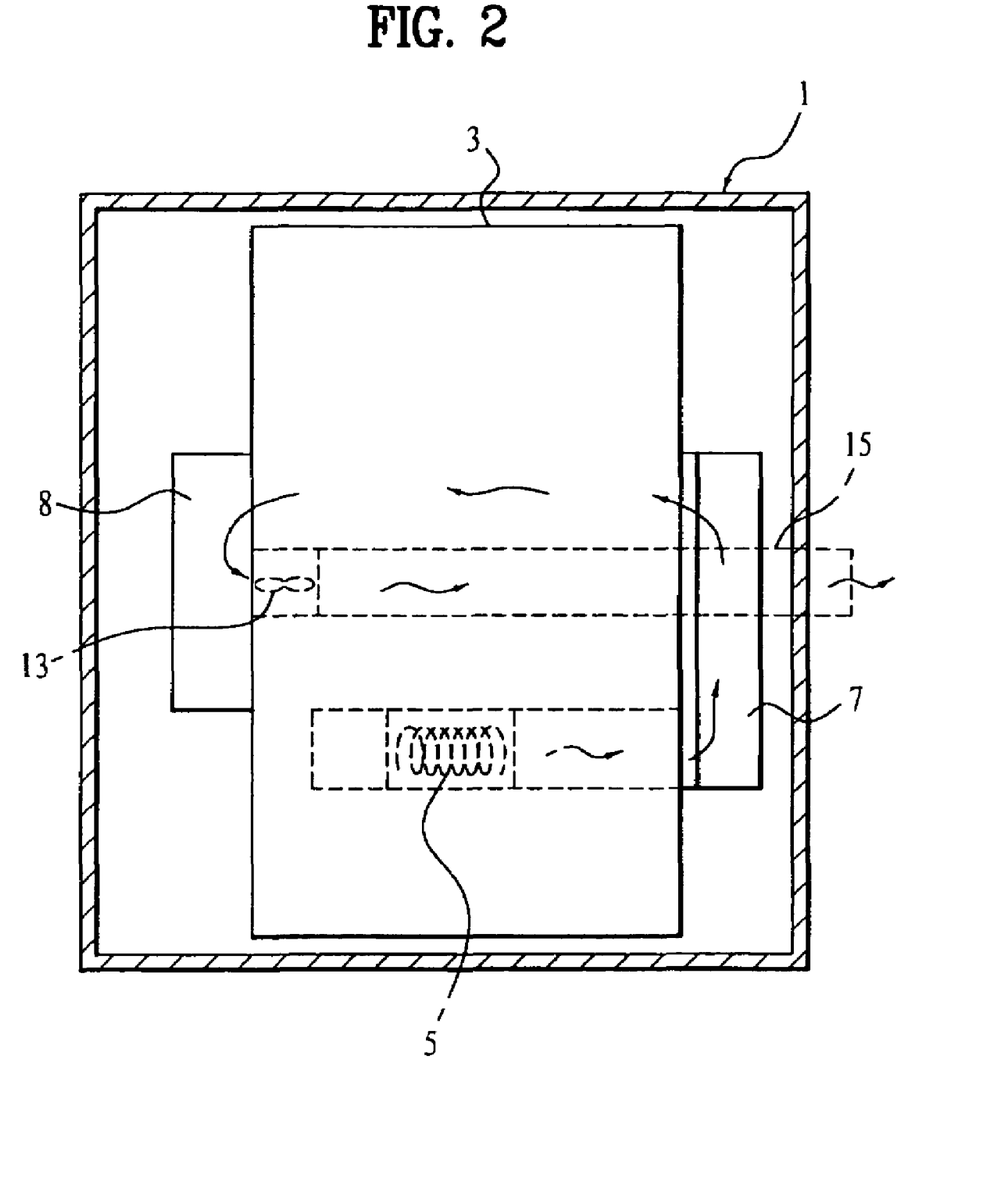
FIG. 2 illustrates a cross section of key parts of the exhaust type laundry dryer in FIG. 1.

FIG. 1 illustrates a longitudinal section of a related art exhaust type laundry dryer, and FIG. 2 illustrates a cross section of flow passage of the exhaust type laundry dryer in FIG. 1.

Referring to FIGS. 1 and 2, the exhaust type laundry dryer includes a body 1 having a door 2 mounted on a front, a drum 3 rotatably mounted in the drum having a plurality of lifters 4 on an inside circumferential surface, driving means for providing rotation force to the drum 3, a heater 5 for heating external air drawn thereto to produce hot air, a suction duct 7 in communication with a rear opening of the drum 3 for guiding the hot air from the heater 5 to an inside of the drum 3, a lint duct 8 in communication with a front opening of the drum 3 for guiding wet air after drying laundry to an exhaust duct 15, and a fan 13 in rear of the lint duct 8 for generating blowing force.

There is a filter 14 mounted to an inlet to the lint duct 8 for filtering foreign matters, such as dust or lint from the air discharged from the drum 3.

The driving means for rotating the drum 3 includes a drying motor 10, and a driving belt 12 connected to a driving pulley 11 fixed to the drying motor 10 and wound around an outside circumference of the drum 3, wherein if the driving pulley 11 rotates following rotation of the drying motor 10, the belt 12 wound around the driving pulley 11 rotates to rotate the drum 3.

On a front side of the drum 3, there is an electrode sensor 30 for detecting a dryness of a drying object. The electrode sensor 30 has two metal plates arranged in parallel, for sensing the dryness of laundry by using impedances generated at opposite ends of the electrodes according to moisture content of the drying object when the drying object is brought into contact with the opposite metal plates, and forwards the dryness as a voltage signal.

In order to perform a drying course of the drying object according to an order of the user, the heater 5 and the drying motor 10 are put into operation, to rotate the drum 3 and drive the fan 13.

External air is drawn following driving of the fan 13, heated at the heater 5, forcibly introduced into the drum 3 which is being rotating through the suction duct 7, vaporizes moisture in the drying object which is in a wet state to dry the drying object, to become low temperature high humidity air, and discharged to an outside of the laundry dryer through the lint duct 8 and the exhaust duct 15.

While repeating above steps, the laundry dryer dries the drying object, determines dryness of the drying object sensed at the electrode senor 30, and controls operation of the laundry dryer, accordingly.

The laundry dryer of the present invention determines not only the dryness of the drying object, but also a load of the drying object at starting of the drying course by using the electrode sensor 30.

A system for performing a drying course algorithm of the present invention and a method for controlling the same will be described.

Figure 3:
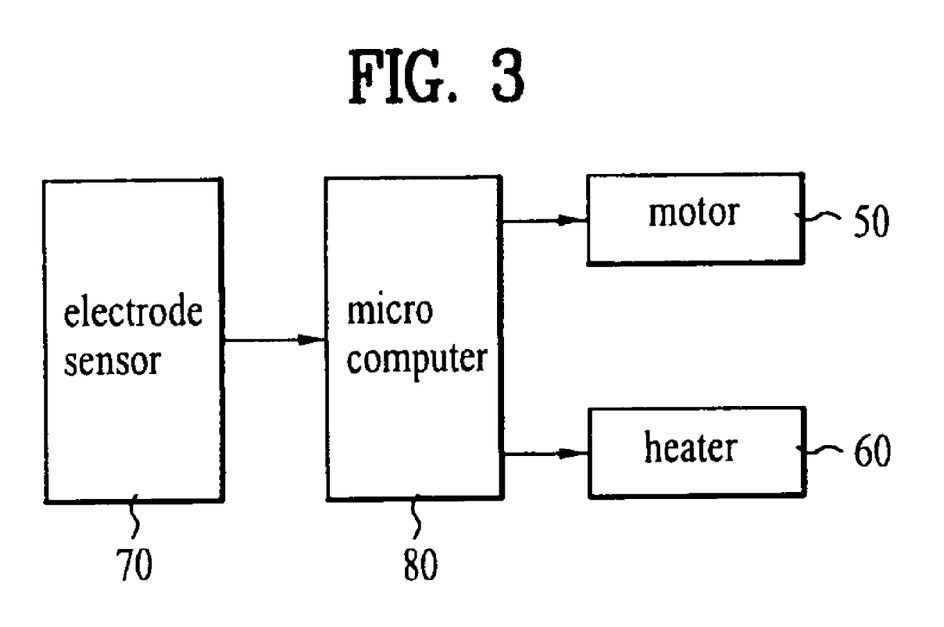
FIG. 3 illustrates a block diagram of a system of a drying course in a laundry dryer in accordance with a preferred embodiment of the present invention.

Referring to FIG. 3, the laundry dryer of the present invention includes a drum 3, a drying motor 10, a heater 5, an electrode sensor 30, and a microcomputer 80 for determining an amount of the drying object with reference to a saturation time point T_sat at which the dryness sensed at the electrode sensor 30 exceeds a preset reference value Q, and varies a rotation speed of the drying motor 10 according to the amount of laundry determined thus.

Figure 4:
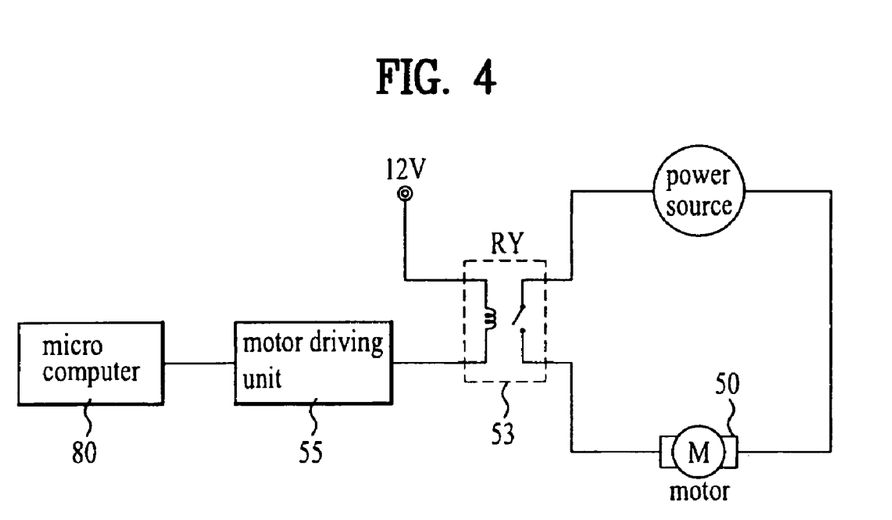
FIG. 4 illustrates a block diagram of an exemplary drying motor control system.

Referring to FIG. 4, if the drying motor 10 is a constant speed induction motor which rotates in one direction at a fixed rotation speed, the drying motor 10 includes a relay RY 53 for starting supply of power to the drying motor 10, and a motor driver 55 for driving the relay 55 in response to a control signal from the microcomputer 80.

In the meantime, instead of the constant speed induction motor, a reversible motor or a BLDC motor with a variable speed can be applied thereto.

The electrode sensor 30 of a contact type is mounted on a front side in the drum for sensing dryness of the laundry during a drying course.

The electrode sensor 30 provides the voltage signal for a moisture content of the drying object, and the microcomputer 80 receives the voltage signal of the electrode sensor 30 through an A/D input port.

Figure 5:
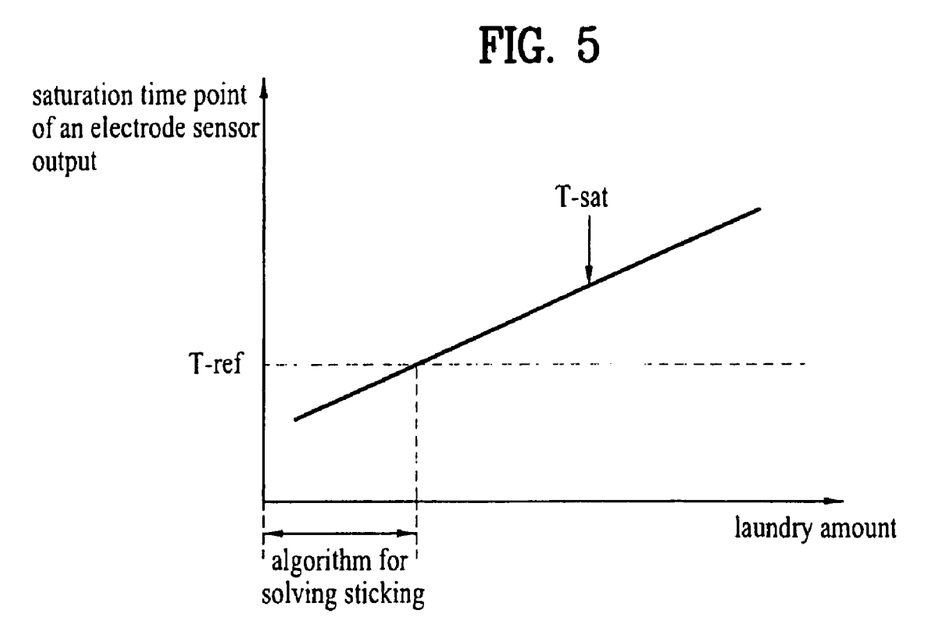
FIG. 5 illustrates a graph showing a relation of a laundry amount versus a saturation time of a electrode sensor.

Referring to FIG. 5, if it is defined that a time point at which an output (i.e., the dryness) of the electrode sensor 30 exceeds a preset reference value Q is a saturation time point T_sat of the dryness, it can be known that the smaller the amount of the laundry, the earlier the time point the dryness of the drying object reaches to the saturation time point T_sat.

That is, the present invention is characterized in that the saturation time point T_sat of the dryness is sensed with the electrode sensor 30, and determines the laundry amount of the drying object by using the saturation time point T_sat.

Especially, in the present invention, the microcomputer determines that a time point as a dryness saturation time point T_sat, when the dryness sensed at the electrode sensor 30 keeps higher than a reference value Q (for an example, 4.3V) for a predetermined period T0 (for an example, 30 seconds).

Moreover, the microcomputer 80 determines the load of the drying object depending on whether the dryness saturation time point T_sat is sensed within a preset time period T_ref or not, and the drying course is performed while varying the drying algorithm depending on the load of the drying object.

A process for sensing a laundry amount and a process for controlling a drying course according to the load will be described.

Upon applying a course starting order after the user introduces wet drying objects into the drum, the microcomputer 80 recognizes this to rotate the drying motor 10 in one direction slowly, and put the heater 5 into operation.

According to this, air is heated to hot and dry air at the heater 5, and introduced into the drum. The hot air heated at the heater 5 absorbs moisture from the drying object while circulating through the inside of the drum, to progress the drying course.

Figure 6:
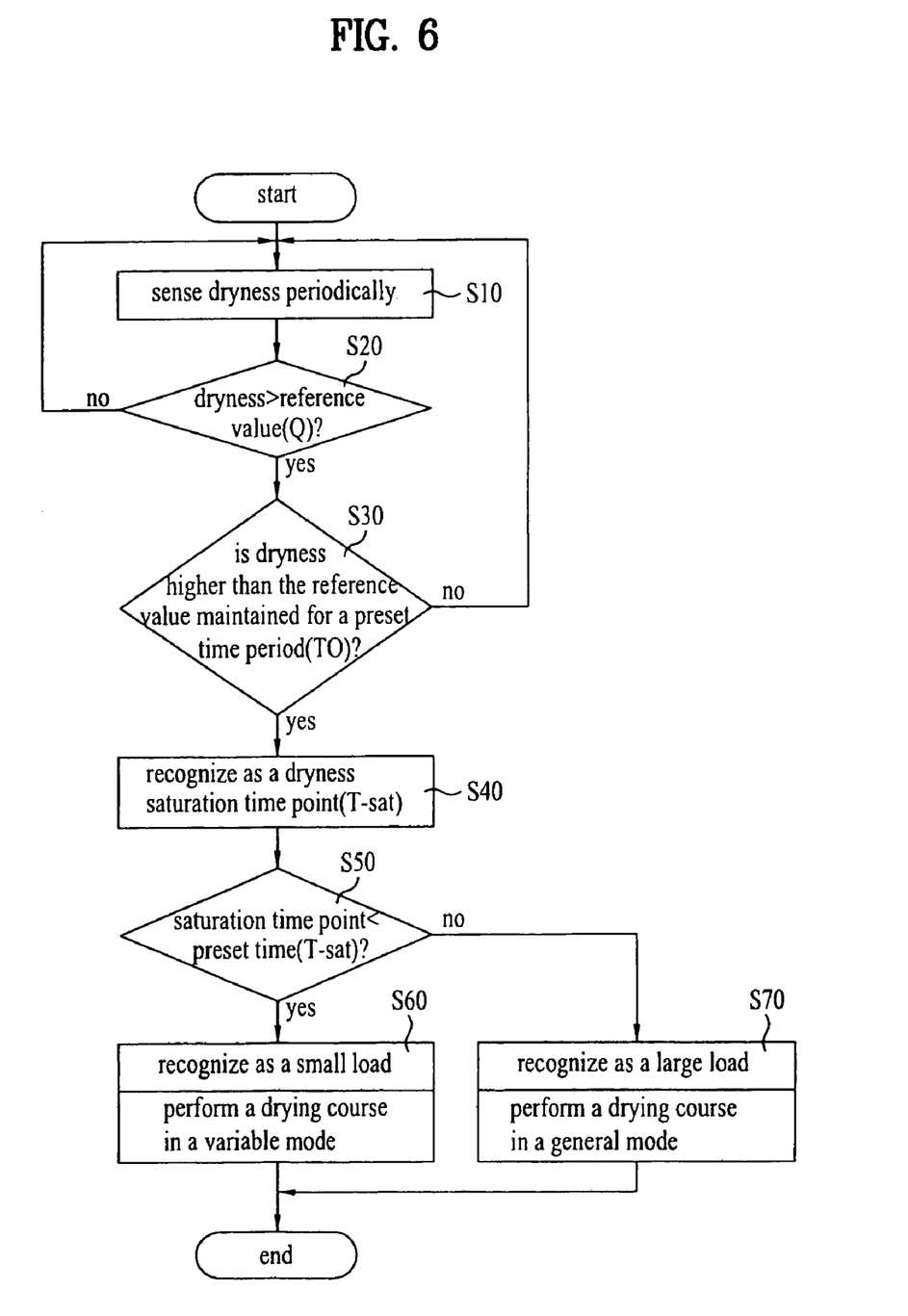
FIG. 6 illustrates a flow chart showing the steps of a method for controlling a drying course of a laundry dryer in accordance with a preferred embodiment of the present invention.

Referring to FIG. 6, during the drying course is in progress, the microcomputer 80 receives the voltage signal from the electrode sensor 30, to read in the dryness of the drying object periodically (S10).

Then, the microcomputer 80 determines whether the present dryness exceeds the preset reference value Q or not, and whether a dryness higher than the reference value Q is maintained longer than a preset time period T0 or not (S20), (S30).

As a result of the determination (S20) (S30), if the present dryness does not exceed the reference value Q, or even if exceeds, fails to be maintained for the preset time period T0, the microcomputer 80 keeps reading the dryness periodically while maintaining the drying course.

Opposite to this, as the result of the determination (S20) (S30), if the present dryness is maintained for the preset time period T0, the microcomputer 80 determines the time point as the dryness saturation time point T_sat (S40).

If the saturation time point T_sat of the electrode sensor determined thus is sensed after a preset time period T_ref (for example, 5 min.) from starting of the drying course (T_sat>T_ref) (S50), the microcomputer 80 determines that the load is large that is not liable to cause sticking, and performs the drying course according to an algorithm of an general mode (S60).

In the general mode, it is preferable that the drying motor 10 is rotated at a constant or in one direction without variation of a rotation speed or direction.

If the saturation time point T_sat of the electrode sensor 30 is sensed before pass of the preset time T_ref after starting of the drying course (T_sat<T_ref) (S50), the microcomputer 80 determines that the load is small that is liable to cause sticking, and performs the drying course according to an algorithm of a variable mode (S70).

In the present invention, if it is determined that the load is small, the drying mode is changed in which rotation of the drum is varied for solving the sticking in the small load.

In the change of drying mode, the drying motor 10 is stopped temporarily or a rotation direction of the drying motor 10 is changed.

Figure 7:
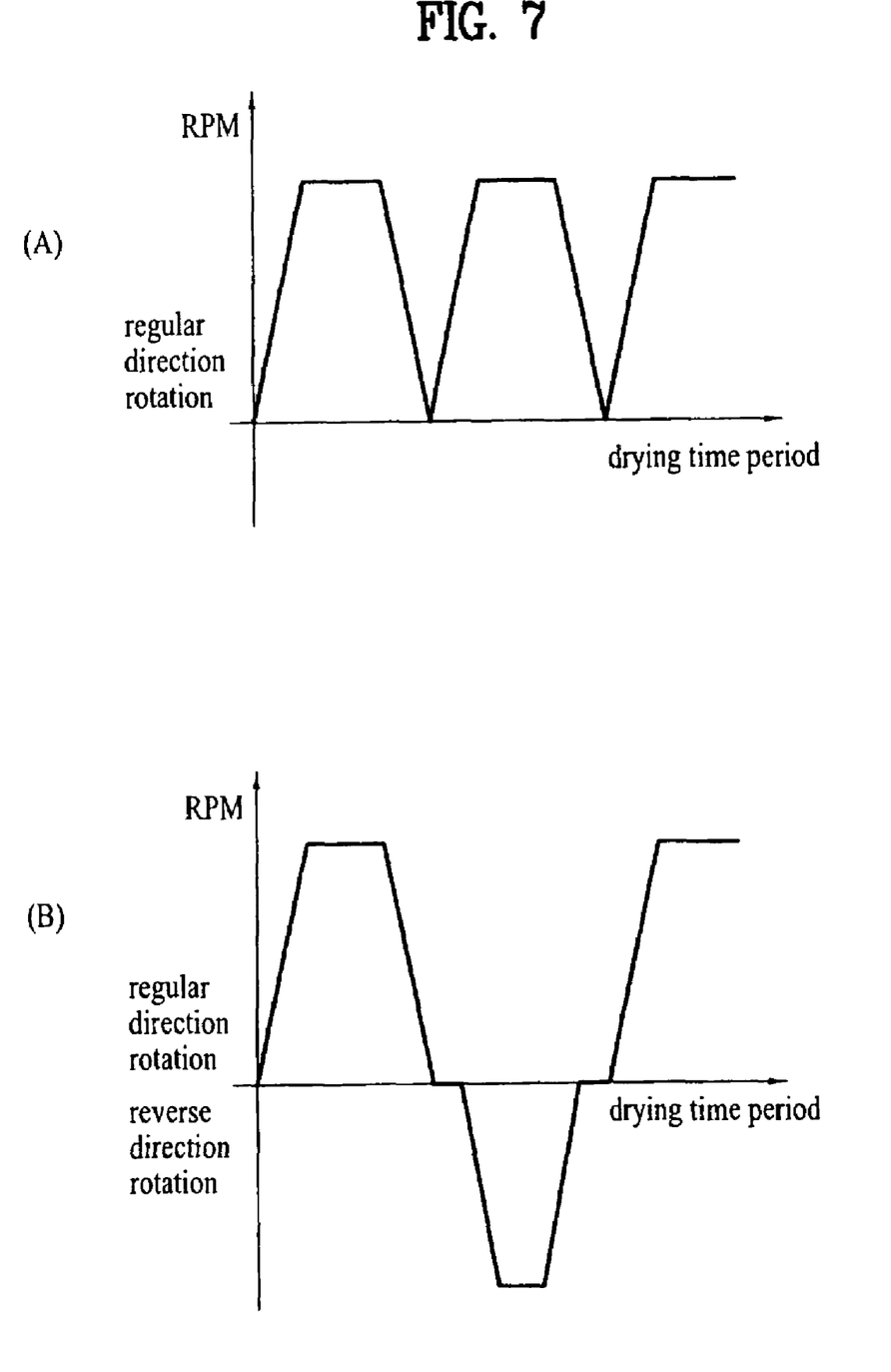
FIG. 7 illustrates a graph showing a variation of RPM of a drying motor for a low load.

That is, referring to FIG. 7A, if it is determined that the amount of the drying object is small, the drying motor 10 rotating in one direction is stopped temporarily. For example, a step is repeated for three times, in which the drum is stopped for one second and rotated again in a regular direction starting from a time point when it is determined that the laundry amount is small.

Or, referring to FIG. 7B, if the drying motor 10 is a reversible motor, the drying motor 10 rotating in one direction is stopped temporarily, and reverses for a predetermined time period. For an example, a step is repeated for three times with three minute intervals, in which the drum is stopped for one second, rotated in an opposite direction for one second, and rotated in a regular direction again.

In this instance, in a case the drying motor 10 is rotated in a reverse direction, since a flow rate of the air introduced into the drum can be reduced momentarily, it is preferable that the reversing is set to be the shortest as far as possible so that the reversing does not affect the drying performance.

Thus, if it is determined that the load is small, the drying course is performed while varying the rotation speed, and if a target dryness is reached, the microcomputer 80 recognizes it as a drying completion time point, and terminates the drying course.

The laundry dryer of the present invention has the following advantages.

First, the accurate sensing of a small laundry amount with the electrode sensor permits to present the drying object from being dried inadequately, or excessively, thereby improving drying uniformity of a small load.

Second, the temporary change of a drying course algorithm in the drying course of small load permits to solve the sticking of the laundry to an inside wall of the drum, thereby reducing a drying time period, and improving a drying performance.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for controlling a drying course of a laundry dryer, comprising:

(a) starting a drying course by using high temperature drying air, and periodically sensing dryness of a drying object;

(b) determining a dryness saturation time point at which the sensed dryness exceeds a preset reference value Q;

(c) determining a load of the drying object according to the determined drying saturation time point T_sat; and (d) performing a drying algorithm depending on the determined load of the drying object, wherein performing the drying algorithm includes performing the drying course according to a variable mode drying algorithm in which a general mode is varied when the determined load of the drying object is a small load, wherein determining the dryness saturation time point includes:

determining whether the dryness of the drying object exceeds the preset reference value Q after starting the drying course, determining whether the dryness greater than the preset reference value Q is maintained for a prescribed time period that starts when the dryness of the drying object first exceeds the preset reference value Q, and recognizing a time point as the drying saturation time point T_sat when the preset reference value Q is exceeded for a first time and the dryness greater than the preset reference value Q is maintained for the prescribed time period.

2. The method for controlling a drying course of a laundry dryer of claim 1, wherein determining the load includes:
   determining that the load is the small load when the drying saturation time point T_sat is sensed within a preset time period T_ref, and
   determining that the load is a large load when the drying saturation time point T_sat is sensed outside of the preset time period T_ref.

3. The method for controlling a drying course of a laundry dryer of claim 1, wherein performing the drying algorithm further includes:
   performing the drying course according to a general mode drying algorithm when the determined load of the drying object is a large load.

4. The method for controlling a drying course of a laundry dryer of claim 3, wherein in the general mode driving algorithm, a drying motor rotates at a constant speed or rotates in one direction.

5. The method for controlling a drying course of a laundry dryer of claim 1, wherein in the variable mode driving algorithm, a drying motor rotates at a variable speed or rotates in a variable direction.

6. The method for controlling a drying course of a laundry dryer of claim 1, wherein the variable mode drying algorithm includes:
   rotating a drying motor in a first direction;
   temporarily stopping the rotating in the first direction; and
   rotating the drying motor in the first direction after temporarily stopping the rotating in the first direction.

7. The method for controlling a drying course of a laundry dryer of claim 1, wherein the variable mode drying algorithm includes:
   rotating a drying motor in a first direction;
   temporarily stopping the rotating in the first direction; and
   rotating the drying motor in a second direction after temporarily stopping the rotating in the first direction.

8. A method of controlling a drying operation of a laundry dryer, comprising:
   starting a drying operation of a drying object;
   sensing dryness of a drying object during the drying operation;
   determining a dryness saturation time point when the sensed dryness exceeds a preset reference value for a prescribed amount of time;
   determining that the drying object is a small load when the determined dryness saturation time point occurs within a prescribed time period that starts from a beginning of the drying operation; and
   varying the drying operation when the drying object is determined to be the small load, wherein varying the drying operation includes one of providing a varying speed of a drying motor or providing varying directions of the drying motor,
   wherein determining the dryness saturation time point includes:
      determining whether the dryness of the drying object exceeds the reference value after starting the drying operation,
      determining whether the dryness greater than the reference value is maintained for a prescribed time period that starts when the dryness of the drying object first exceeds the reference value, and
      recognizing a time point as the dryness saturation time point when the reference value is exceeded for a first time and the dryness greater than the reference value is maintained for the prescribed time period.

9. The method of claim 8, wherein providing the varying speed includes:
   rotating a drum at a first speed and in a first direction using the drying motor;
   slowing the rotating of the drum from the first speed;
   temporarily stopping rotating of the drum in the first direction; and
   increasing rotation of the drum in the first direction after temporarily stopping rotating of the drum.

10. The method of claim 8, wherein providing the varying directions includes:
   rotating a drum at a first speed and in a first direction using the drying motor;
   slowing the rotating of the drum from the first speed;
   temporarily stopping rotating of the drum in the first direction; and
   rotating the drum in a second direction using the drying motor after temporarily stopping rotating of the drum.

11. The method of claim 8, further comprising determining that the drying object is a large load when the determined dryness saturation point occurs after the prescribed rime period.

12. The method of claim 11, further comprising performing the drying operation of the determined large load by rotating a drum at a constant speed when the drying object is determined to be the large load.

13. The method of claim 11, further comprising performing the drying operation of the determined large load by rotating a drum in one direction when the drying object is determined to be the large load.

14. The method of claim 11, further comprising performing the drying operation according to a general mode drying algorithm when the drying object is determined to be the large load.

15. A method of controlling a drying operation of a laundry dryer, comprising:
   starting a drying operation of a drying object;
   sensing dryness of a drying object during the drying operation;
   determining a dryness saturation time point based on the sensed dryness exceeding a preset reference value for a prescribed amount of time;
   determining a type of load for the drying object based on the determined dryness saturation time point and a prescribed time period from a start of the drying operation; and
   changing a rotation of a drum by a drying motor based on the determined type of load,
   wherein determining the dryness saturation time point includes:
      determining whether the dryness of the drying object exceeds the preset reference value after starting the drying operation,
      determining whether the dryness greater than the preset reference value is maintained for a prescribed time period that starts when the dryness of the drying object first exceeds the preset reference value, and
      recognizing a time point as the dryness saturation time point when the preset reference value is exceeded for a first time and the dryness greater than the preset reference value is maintained for the prescribed time period.

16. The method of claim 15, wherein changing the rotation includes the driving motor providing a varying speed of rotation for the drum.

17. The method of claim 15, wherein changing the rotation includes the driving motor providing varying directions of rotation for the drum.

* * * * *